June 7, 1927. 1,631,375
O. C. KENYON
LAWN RAKE
Filed March 14, 1924
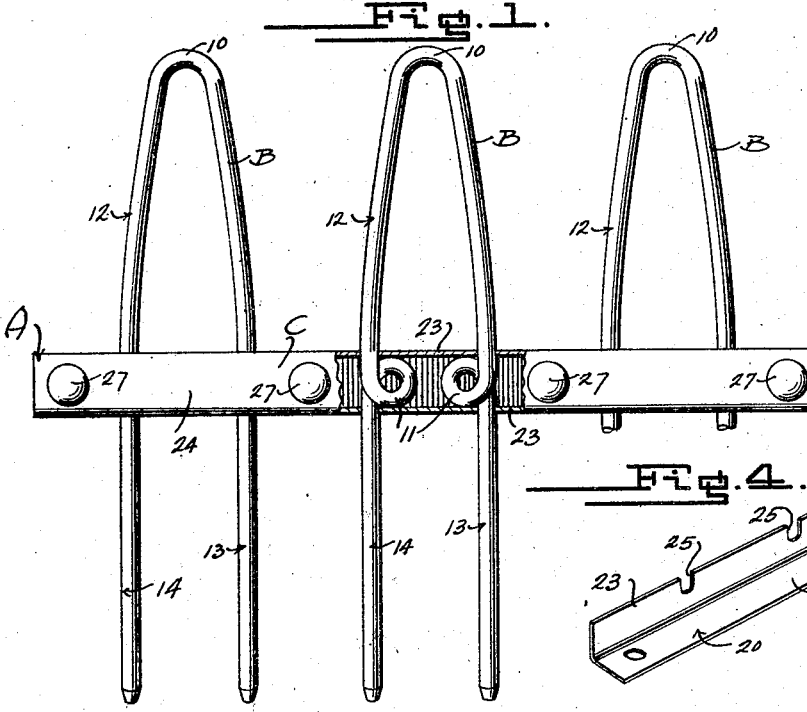
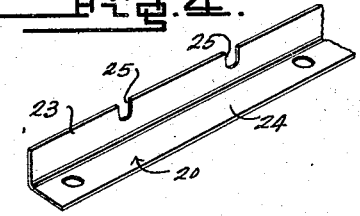
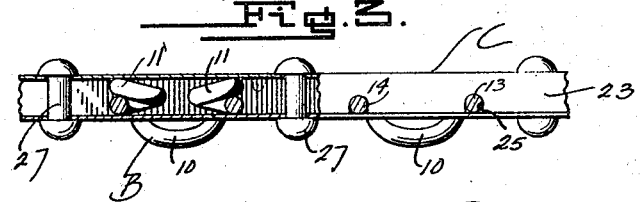
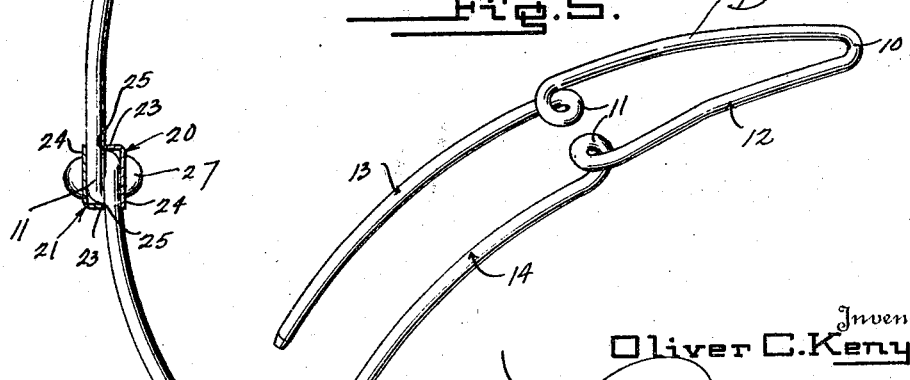
Inventor
Oliver C. Kenyon
By Lancaster and H. Alvine
Attorneys Patented June 7, 1927.

1,631,375

UNITED STATES PATENT OFFICE.

OLIVER C. KENYON, OF GENEVA, ILLINOIS.

LAWN RAKE.

Application filed March 14, 1924. Serial No. 699,267.

This invention relates to improvements in rakes.

The primary object of this invention is the provison of a lawn rake which embodies a novel type of tooth structure, and means for retaining the tooth on a supporting frame.

A further and important object of this invention is the provision of a rake structure which includes a novel type of supporting bar and an improved tooth structure which cooperates with the bar structure to provide a rake in which the teeth are connected in a durable relation against liability of detachment incident to use or wear.

A further and important object of this invention is the provision of a lawn rake which is strong, efficient to use, practical, and of light weight as to best adapt it for use in connection with raking of lawns and the like.

In the ordinary lawn rake which embodies a tooth structure connected to a supporting bar to provide a pair of teeth at one side of the bar and a blunt ended U-shaped tooth at the other side of the bar, the tooth structure is not effectively connected to the frame, and in short time the teeth will work loose. Continual driving of the teeth into place renders the teeth ineffective for use, as they become disaligned and in time are so loose that they will not retain their position in the rake structure. Various expedients for retaining teeth have been proposed, and in general use the teeth are either crimped into a supporting frame or the frame is mutilated into engagement with the tooth. Soldering has also been tried, but the results are no better. With the improved type of rake the supporting bar is sectionally formed to receive the teeth prongs in such relation therein that the prongs cannot become detached so long as the sections of the frame are held together. The rake is reinforced in proper manner, and the structure takes into consideration the fact that the single strands of teeth are used more than the U-shaped teeth.

Other objects and advantages of this invention will be apparent during the course of the following detailed description.

In the accompanying drawing, forming a part of this specification, and wherein similar reference characters designate corresponding parts throughout the several views, Figure 1 is a fragmentary plan view of the improved lawn rake frame and tooth structure, showing the sectional construction of the frame and the novel manner in which the teeth are formed to cooperate with the frame.

Figure 2 is a transverse cross sectional view taken through the rake head.

Figure 3 is a fragmentary view, partly in section, taken longitudinally through a portion of the rake frame, showing the novel association of the teeth with the frame.

Figure 4 is a perspective view of part of a frame section.

Figure 5 is a perspective view of one of the novel tooth structures which are formed to provide a plurality of teeth.

In the drawing, wherein for the purpose of illustration is shown only a preferred embodiment of this invention the letter A may generally designate the improved rake structure, which may consist of a series of the novel teeth structures B supported upon a novel type of frame or supporting bar C.

A series of the tooth structures B are of course employed in connection with the rake, and each of the tooth structures B consist of a length of wire material, which in the ordinary instance is number 9 gage annealed steel wire, bent intermediate its ends to provide a pair of lengths of material connected by an arcuate bight 10. Each one of these lengths of material is bent intermediate its ends to provide a complete loop 11; the loops 11 extending inwardly towards each other and lying in the same plane. To one side of the loops 11 a U-shaped tooth 12 is provided with the arcuate bight portion 10 at its free end; this tooth being arcuated from the loops 11 toward its free end. From the loops 11 in the other direction, a pair of spaced and substantially parallel teeth 13 and 14 are provided, which are relatively disconnected from the loops 11 towards their free ends; these teeth 13 and 14 being arcuated on the same radius. It is to be noted that the teeth 13 and 14 are disposed in an elevation above the tooth 12, incident to the looping of the tooth structure B intermediate its ends.

The frame C, which may appropriately be called a supporting bar, consists of a pair of angle sections 20 and 21. These angle sections each include a short leg 23 and a longer leg 24. The sections 20 and 21 are provided inwardly of the free margins of their legs 23 with recesses or slots 25 of just sufficient width to receive therein the thickness of the wire of which the tooth structures B are formed. The sections 20 and 21 are riveted or otherwise secured together into a rectangular cross section; the legs 23 providing the side walls, and the legs 24 of the sections 20 and 21 respectively providing top and bottom walls for the rake frame C, and as is illustrated in Figure 2 of the drawing. Rivet elements 27 are secured through the walls 24.

The U-shaped teeth 12 of the series of tooth structures B are, of course, disposed to one side of the frame C, whereas the single strand teeth 13 and 14 are disposed in substantial parallelism to the other side of the frame C. The strands of the teeth 12, 13 and 14 extend through the recesses or slots 25 of the angle sections 20 and 21, so that the loops 11 are secured within the passageway or channel of the frame C. It is to be particularly noted that the legs 23 are of only sufficient depth so that the top and bottom walls 24 may abut the tops and bottoms of the loops 11, whereas the leg portions 24 are of sufficient depth to permit the side walls 23 to engage the sides of the loops. In other words, the height of the passageway in the frame C is substantially equal to the thickness of the two wires in each loop 11, whereas the width of the passageway is equal to the diameter of a loop 11. It is to be noted that the U-shaped tooth 12 is in abutment with the bottom leg 24 of the section 21 and extends outwardly therefrom and in an upward arcuate relation. The arcuate single strand teeth 13 and 14, however, rest upon the leg 23 of the section 21 and are in abutment with the top wall 24. This is an important feature, since the single strand teeth 13 and 14 will be most used, and they are reinforced incident to the fact that they rest upon the side wall or leg 23 and are thereby durably mounted in their frame to withstand the force incident to pulling action upon the rake.

Any approved handle construction (not shown) may be secured to the rake frame C.

From the foregoing description of this invention it is apparent that a lawn rake has been provided which is of an extremely practical nature and may best be used for raking of lawns and the like. It is of very durable construction, and light in weight. This type of rake which employs the blunt ended teeth 12 and the single strand teeth 13 and 14 is generally recognized as the most efficient for use in connection with raking of lawns. The U-shaped blunt teeth 12 are generally used in the springtime and in seasons when the soil is very loose, so that the grass can be properly raked without pulling up of the soil. On the other hand, in seasons when the grass is very thick, such as in late summer or fall, the single strand teeth 13 and 14 are used for raking, and are best adapted to get beneath the dead grass, leaves, and the like for the purpose of extracting them.

Various changes in the shape, size, and arrangement of parts may be made to the form of the invention herein shown and described, without departing from the spirit of this invention or the scope of the claims.

I claim:

1. In a lawn rake the combination of a supporting bar comprising a pair of sections, teeth for said sections having complete loops therein, and means for clamping the supporting bar sections together with the loops snugly clamped between said sections for the purpose of securing the teeth in a durable relation to said supporting bar.

2. In a lawn rake, the combination of a rake frame comprising a pair of angle sections each comprising a short leg and a longer leg, the short leg having a plurality of spaced apart recesses leading inwardly from its free margin, means securing said angle sections together with the short legs abutting the longer legs to provide a passageway extending longitudinally thru the frame, and a series of tooth structures having complete loops intermediate their ends disposed in said passageway and with portions extending from said loops in opposite direction thru said recesses.

3. In a lawn rake the combination of series of tooth structures each having a tooth strand formed with a complete loop, a sectional supporting frame including top, bottom, and side walls, and means for clamping the sections of said frame together with the strands of the tooth structure extending through the side walls of the frame in a secured relation therewith and with said side walls abutting against opposite sides of said loops, and the top and bottom walls abutting against the top and bottom of said loops.

4. In a lawn rake the combination of a rake frame consisting of a pair of angle sections connected to provide a passageway extending longitudinally therethrough, said frame sections providing spaced side walls having aligning openings therein, and teeth carried by said frame each including a tooth strand having a loop therein and a projecting portion at the opposite side of the loop from the tooth strand, said teeth having their loops snugly fitted in the frame passageway with the teeth strands extending thru the openings of one side wall of the frame and with the projecting portions thereof projecting into the openings of the other side wall of said frame.

5. A rake comprising teeth each provided with a complete loop substantially midway of its ends, and a tooth supporting frame having said loops completely enclosed and embedded in braced relation therein.

OLIVER C. KENYON.